United States Patent [19]
Phillips

[11] 3,820,006
[45] June 25, 1974

[54] POWER CONVERTER APPARATUS AND SILICON CONTROLLED RECTIFIER SWITCHING CIRCUIT THEREFOR
[75] Inventor: Edward H. Phillips, Los Altos, Calif.
[73] Assignee: Programmed Power, Inc., Menlo Park, Calif.
[22] Filed: Nov. 24, 1972
[21] Appl. No.: 309,161

[52] U.S. Cl............................................. 321/45 R
[51] Int. Cl. ........................................... H02m 7/52
[58] Field of Search ...................... 321/45 R, 45 C

[56] References Cited
UNITED STATES PATENTS

| | | | |
|---|---|---|---|
| 3,207,974 | 9/1965 | McMurray | 321/45 C |
| 3,418,558 | 12/1968 | Morgan et al. | 321/45 C |
| 3,594,629 | 7/1971 | Kawakami et al. | 321/45 C X |
| 3,683,267 | 8/1972 | Akamatsu | 321/45 R |
| 3,701,939 | 10/1972 | Petersen et al. | 321/45 C X |
| 3,710,230 | 1/1973 | VeNard | 321/45 C |

OTHER PUBLICATIONS
IBM Technical Disclosure Bulletin, "Switch Voltage Regulator," Vol. 6, No. 8, January, 1964.

Primary Examiner—William M. Shoop, Jr.
Attorney, Agent, or Firm—Flehr, Hohbach, Test, Albritton & Herbert

[57] ABSTRACT

Power conversion apparatus utilizing high frequency controlled switching for converting an unregulated d.c. voltage to a.c. or controlled d.c. output voltages. The apparatus includes one or more programmed current switches for switching the current. The programmed current switches include a series pass silicon cotrolled rectifier (SCR) and one or more commutating SCR's and associated circuits. A control system integrates the input d.c. voltage, compares the voltage with a reference voltage, corresponding to the desired output, and generates firing voltages for the series pass and commutating SCR's to provide the desired output voltage. All SCR's are turned off with significant back bias, have controlled di/dt turn-on, and are subjected to controlled dv/dt upon the reapplication of forward voltage.

20 Claims, 37 Drawing Figures

POWER CONVERTER APPARATUS AND SILICON CONTROLLED RECTIFIER SWITCHING CIRCUIT THEREFOR

BACKGROUND OF THE INVENTION

The present invention is directed to power conversion apparatus and more specifically to apparatus utilizing high frequency programmed current switching circuits for converting an unregulated d.c. power to a regulated low frequency a.c. or d.c. output power and to programmed current switches employing series pass SCR's and commutating SCR's and associated circuit elements for switching the current.

In many power distribution systems it is desired to have a stable source of low frequency or d.c. power. Such systems may have sensitive loads such as computers and their associated peripheral equipment or measuring instruments. When such sources are adjustable in both voltage and frequency, they are suitable also for driving motors at varying speeds.

A controlled low frequency power source is also useful wherein an uninterruptable power supply is needed. Here, inverter circuits are utilized for inverting a d.c. potential taken from storage batteries, which may be connected to a battery charger powered from an associated a.c. power supply line. Such inverter circuits are commonly used in generating 60 Hz from the d.c. battery source. In general, inverters generate complex waveforms which require extensive filtering and voltage regulation. This results in the requirement for 60 Hz transformer and filter components which are both massive and expensive.

Solid state inverter circuits employing silicon controlled rectifiers (SCR's) to control the flow of current are known in the art. The series pass SCR's are generally commutated by providing alternate paths for the current with feedback rectifiers employed to conduct excess commutating currents during turn-off. The SCR's are turned off by inverse voltage impulses which are applied to commutation circuits of sufficiently low impedance to provide extinguishing current and are of sufficient amplitude and duration to more than extinguish the current flow through the SCR's. In many such circuits the inverse voltage impulses actually imposed upon the series pass SCR's are only the voltage drop across the single feedback rectifier and have been marginal. Under certain load conditions the inverters have failed. The rate of rise of current flowing in the series pass SCR's has often become excessive at turn-on due to the lack of appropriate series impedance. Also, the rate of rise of voltage has often not been inherently controlled upon the reapplication of forward voltage due to the design of certain commutating circuits.

OBJECTS AND SUMMARY OF THE INVENTION

It is an object of the present invention to provide an improved power conversion apparatus and programmed current switching circuits for use therewith.

It is another object of the present invention to provide power conversion apparatus which is easily controllable and provides relatively simple output waveforms.

It is another object of the present invention to provide power conversion apparatus which is relatively immune to changes in load.

It is a further object of the present invention to provide power conversion apparatus which operates at relatively high frequency to provide controlled d.c. or a.c. output voltages.

It is a further object of the present invention to provide power conversion apparatus employing improved SCR switching circuits.

It is a further object of the present invention to provide an SCR programmed current switching circuit in which all SCR's are turned off with significant back bias, are turned on with controlled $di/dt$, and are subjected to controlled $dv/dt$ upon the reapplication of forward voltage.

In accordance with the above and other objects of the invention, there is provided power conversion apparatus for converting an unregulated d.c. high power signal to a regulated low frequency a.c. or d.c. signal including programmed current switches utilizing series pass SCR's, commutating SCR's and associated circuit components for switching the series pass SCR's. The programmed current switches are operated at a relatively high frequency and control means are provided for firing the SCR's to generate an average power output signal corresponding to an amplified low frequency or d.c. reference signal. Means are provided for coupling the amplified power signal to a load, such means including a low pass filter for filtering the power output signal to a smooth waveform.

DESCRIPTION OF PREFERRED EMBODIMENTS

Figure 1:
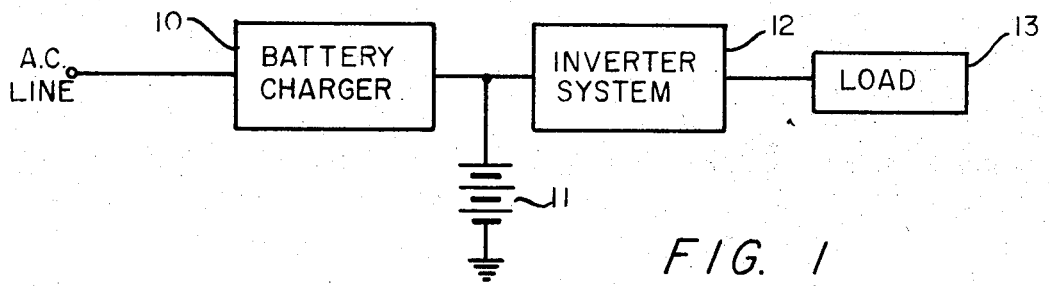
FIG. 1 is a block diagram of a typical system employing the present invention.

FIG. 1 illustrates a typical system in which converters in accordance with the present invention are utilized. The power distribution system has the feature that it supplies uninterruptable power to an associated load 13 from an a.c. input line. As will become apparent, the inverter is suitable for providing extremely accurate voltages in both magnitude and frequency to the relatively sensitive load 13. The system includes a battery charger 10 which is adapted to charge the batteries 11 from the associated a.c. line and inverter system 12 which employs pulse width modulation for converting the d.c. voltages at the battery 11 to a low frequency or d.c. voltage for the load 13.

Figure 2:
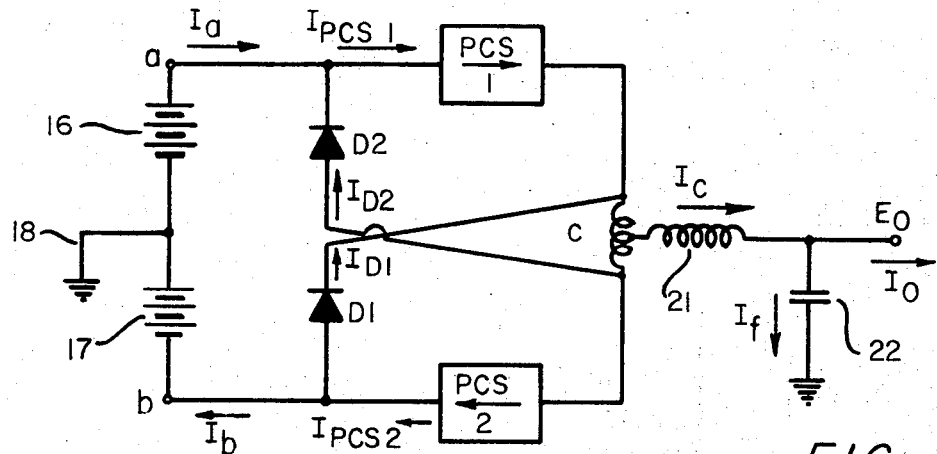
FIG. 2 is a simplified circuit diagram of a center tapped power supply converter in accordance with the present invention.
Figure 3:
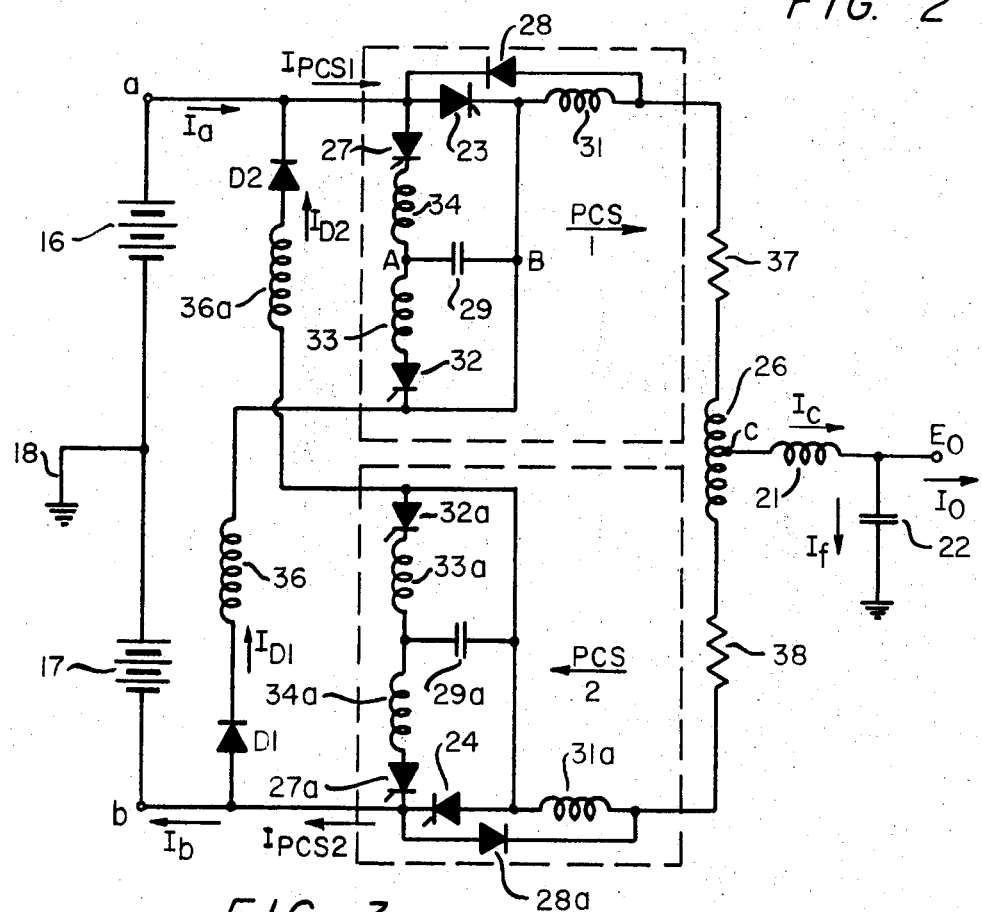
FIG. 3 is a detailed circuit diagram of the converter of FIG. 2.

FIGS. 2 and 3 show a center tapped power supply converter. The circuit is shown connected to batteries 16 and 17 with their center tap grounded at 18. A first programmed current switch PCS 1 is associated with the $a$ terminal of battery 16 and a second programmed switch PCS 2 is associated with the $b$ terminal of battery 17. Currents $I_a$ and $I_b$ are associated with the batteries 16 and 17. Diodes D1 and D2 are employed to conduct current to the load when the associated switches PCS 1 and 2 are off; that is, whenever PCS 1 is on, D2 is also on conducting current previously flowing in PCS 2 and, conversely, when PCS 2 is on, D1 is conducting the current previously flowing in PCS 1. Twice each cycle, however, the switches PCS 1 and 2 overlap on the "on" state to pump circulating current through inductors 26, 31 and 31a to the design level in the circuit. The circulating current is identified as the average of $(I_{PCS\ 1} + I_{D1})$ and $(I_{PCS\ 2} + I_{D2})$. The current flowing out of point $c$ is identified as the net difference between $(I_{PCS\ 1} + I_{D1})$ and $(I_{PCS\ 2} + I_{D2})$. The voltage at point $c$ is a pulse width modulated rectangular wave which is averaged by the two pole filter consisting of inductor 21 and capacitor 22 to provide a programmed output voltage and current $E_o$, $I_o$.

It is seen that each half of the battery is alternately coupled to the filter input at point $c$. A positive value of current $I_c$ draws power from the positive battery but returns power to the negative battery. Thus, a positive concurrent output voltage $E_o$ results in a greater power draw from the positive battery then returned to the negative battery since point $c$ must be preponderantly coupled to the positive battery to generate a positive voltage $E_o$. An a.c. programmed voltage would require an identically greater power draw from the negative battery then returned to the positive battery a half cycle later and an identically greater power draw from the negative battery than returned to the positive battery another half cycle later.

Operation of the program switches and diodes to provide the output current is more clearly described in connection with the circuit of FIG. 3 which shows the programmed current switches PCS 1 and 2 in more detail. The primary function of each PCS is to turn on its series pass silicon controlled rectifier 23 and 24 respectively to pass the current $I_{PCS\ 1}$ or $I_{PCS\ 2}$ respectively to the inductor 26 and to then turn itself off punctually before the series pass SCR of the alternate PCS is turned on. The circuit elements associated with the SCR's 23 and 24 shown in FIG. 3 provide the necessary turn-off capability.

Since operation of both PCS's is identical, only operation of the PCS 1 will be described. Silicon controlled rectifier 27 conducts via the inductor 34 and the capacitor 29 (which is initially charged − to +, A to B) to provide an alternate path for the current $I_{PCS\ 1}$ and to turn off the silicon controlled rectifier 23 for its "off" cycle. Assuming that the inverter is started with the point C at 0, PCS 1 is brought into operation by having a high impedance resistor connected from point A to the minus terminal of the battery (not shown). This results in the capacitor 29 being minus on the A side and zero on its B terminal. When silicon controlled rectifier 23 is turned on by the control circuit, to be presently described, the voltage at the terminal B immediately steps to plus and point A immediately steps to zero. The state of the point C is also positive in view of the fact that the positive terminal of the battery 16 is now connected to the output line. When the control circuit turns on commutation SCR 27, the current flowing through the SCR 27 causes point A to immediately step to the plus battery voltage and the point B of the capacitor immediately steps to twice the plus battery voltage which back biases the silicon controlled rectifier 23 turning it off with substantial back bias. The surplus current in excess of the $I_{PCS\ 1}$ is returned through the diode 28 so that the point C remains at a positive voltage. Inductor 31 acts to control the length of time back bias is maintained upon SCR 23. As SCR 27 conducts, the point B rings down to minus during a half cycle of current through the capacitor 29 and inductors 31 and 34 causing the diode D1 to conduct and connect point B to the negative terminal. Point A goes positive with respect to the battery terminal $a$ turning off SCR 27. The point C goes to minus being driven by the negative terminal through the diode D1.

To begin a new cycle, reset SCR 32 is fired under the new condition of point A being at a plus voltage and point B being at a minus voltage. Point B will remain at minus since the diode D1 is conducting, but point A will ring down through the inductor 33 and capacitor 29 three times minus voltage. SCR 23 is fired stepping point B to plus and causing a step rise at point A from three times minus voltage to a minus voltage. On the second cycle, since point A is now minus instead of zero as in the initial cycle, twice the voltage potential is present in the capacitor 29 and twice the current can be commutated by SCR 27.

The inductors 34 in series with SCR 27 and 36 in series with diode D1 ensure proper operation of the SCR's 23 and 27. When diode D1 and inductor 36 are in conduction and SCR 23 is fired, full battery voltage is placed across the inductor 36 in such a way as to decrease its current. When the current goes to zero, diode D1 is back biased with full battery potential and turned off. Since current builds up in SCR 23 only at the rate that it decreases in diode D1, SCR 23 has a controlled $di/dt$ turn-on characteristic. Inductor 34 similarly controls the di/dt turn-on characteristics of the SCR 27 and delays the turn-off of the SCR 27. Also, inductor 36 delays the turn-on of diode D1. These combined current transfer delays enable capacitor 29 to receive an extra or supercharge each cycle. This ensures that the SCR 27 is back biased to turn off and since the supercharging action is load dependent, increases the commutation energy storage as a function of the load current.

It is important to consider the $di/dt$, $dv/dt$, and the turn-off characteristics for each SCR:

SCR 23 has its di/dt during turn-on limited by inductor 36. The rate of rise of current is a constant value proportional to the total battery potential. Its $dv/dt$ during the reapplication of forward voltage is the inverse of the sinusoidally ringing point B as SCR 27 conducts and is, therefore, limited by the series tank circuit of capacitor 29 and inductors 31 and 34. Its turn-off characteristic is to be back biased with a voltage approximately equal to the total battery potential.

SCR 27 has its $di/dt$ limited by inductor 34. Its $dv/dt$ is the inverse of the sinusoidally ringing point A as SCR 32 conducts. Its turn-off characteristic is to be back biased by the supercharge voltage magnitude imposed upon capacitor 29.

SCR 32 has its $di/dt$ limited by inductor 33. Its dv/dt is the inverse of the sinusoidally ringing point B as SCR 27 conducts. Its turn-off characteristic is to be back biased by full battery potential plus the supercharge voltage after resetting capacitor 29.

Table I sets forth operation of the programmed current switch as described above:

TABLE I

| Function | Voltages at Points | | | Result |
|---|---|---|---|---|
| | A | B | C | |
| Start | — | 0 | 0 | Initial Requirement |
| Fire SCR 32 | — | 0 | 0 | VAB minus |
| Fire SCR 23 | 0 | + | + | Start I, build-up, I load |
| Fire SCR 27 | + | +X2 | + | Turn off SCR 23 |
| D28 on, then off | + | +X2 → − | + | Excess commutation energy regenerated |
| D1 on | + | — | — | |
| Recycle | | | | |
| Fire SCR 32 | −X3 | — | — | |
| Fire SCR 23 | — | + | + | |
| Fire SCR 27 | + | +X3 | + | |

Like reference numerals with designation "a" have been applied to like components in PCS 2 and operation of PCS 2 is as described with reference to PCS 1. Thus, it is seen that all the SCR's are turned off with significant back bias and that all of the SCR's have both a controlled $di/dt$ during turn-on and a controlled $dv/dt$ during the reapplication of forward voltage.

Figure 4:
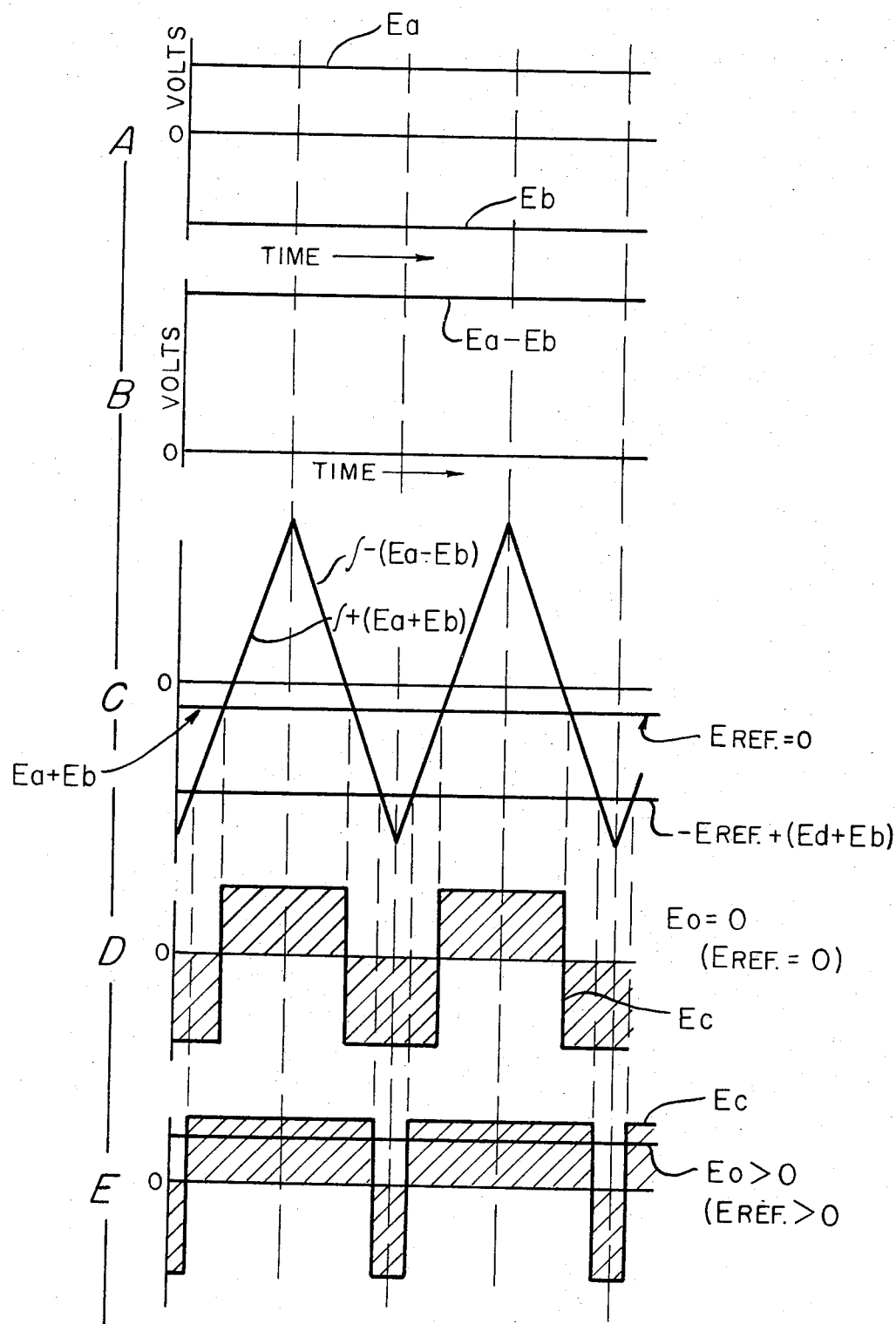
FIGS. 4A-E show typical waveforms useful in understanding the operation of the circuits of FIGS. 2 and 3.
Figure 5:
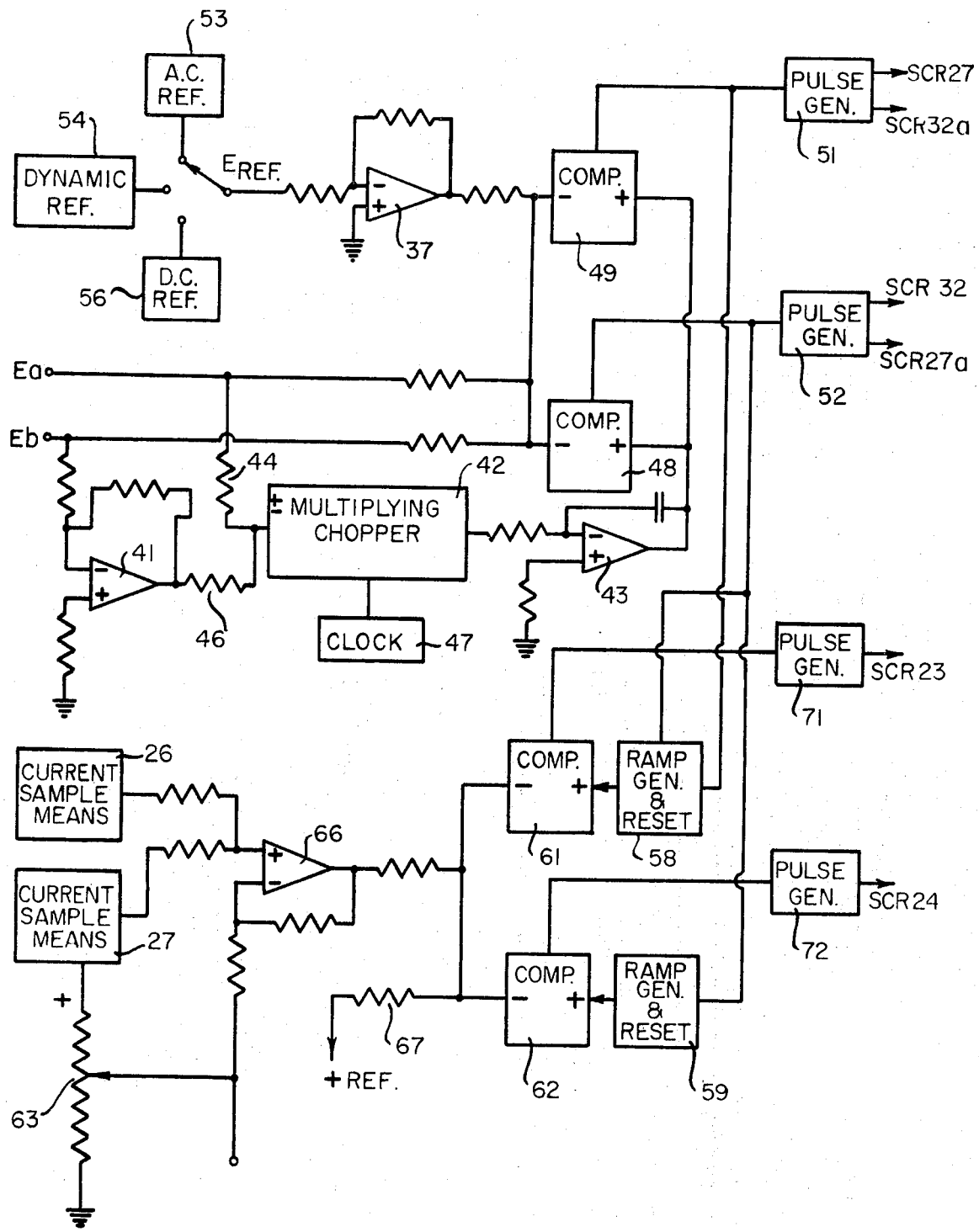
FIG. 5 is a block diagram of a suitable control circuit for controlling the programmed current switches of FIGS. 2 and 3.

Referring now more specifically to FIGS. 4 and 5, the circuit for controlling firing of the silicon controlled rectifiers 23, 24, 27, 27a, 32 and 32a is shown in detail and its operation is depicted in the waveforms.

FIG. 4A shows the voltages from the batteries 16 and 17 as $E_a$ and $E_b$ with the voltages being unequal as might be expected from a battery system with internal resistive impedances supplying a positive current out of the point c of the circuit of FIGS. 2 and 3. In FIG. 4A the voltage $E_a$ is less than $−E_b$. FIG. 7B shows the total battery voltage $E_a−E_b$. The total battery voltage is integrated with periodic inversions to generate a sawtooth integral waveform shown in FIG. 7C by $$\int +(E_a−E_b) \text{ and } \int −(E_a−E_b)$$

The integrated sawtooth voltage is compared with a control voltage $−E_{ref} + (E_2−E_b)$, where $E_{ref}$ is a reference voltage, which determines the desired output. If $E_{ref}$ is zero, the voltage is represented by the line $E_a+E_b$, FIG. 4C. At the intersection of the positive integral and the control voltage, PCS 1 is turned on and PCS 2 is turned off, and at the intersection of the negative integral and the reference, PCS 2 is turned on and PCS 1 is turned off. Thus, the unequal battery voltages are automatically and instantaneously compensated as shown in FIG. 7D wherein the rectangular wave appearing at the point c has a greater positive duration than negative duration whereby the integrated sum over a complete cycle is zero to provide a zero output voltage as determined by the zero reference voltage. For a positive output voltage, $E_{ref}$ is positive but is inverted and added to give the control voltage $−E_{ref} +(E_a+E_b)$. Then the positive battery is connected at point c an even greater interval than the negative battery such as shown in FIG. 4E. The output voltage $E_0$ is greater than zero.

Operation of PCS 1 and 2 and the SCR's to provide the output waveforms shown in FIGS. 4D and 4E is controlled by the control circuit schematically represented in FIG. 5. The control circuit receives the battery input voltages $E_a$ and $E_b$ and forms the triangular waveform of FIG. 4C by the combined action of the inverter 41, multiplying chopper 42 and integrator 43. The voltage $E_b$ is inverted by the inverter 41 whose output is summed with the voltage $E_a$ through the summing resistors 44 and 46. The voltage $E_a−E_b$ is applied to the chopper 42 which is in essence a time switch driven symmetrically +1 and −1 by the clock 47. The output of the chopper is integrated at 43 and applied to the comparators 48 and 49. The comparators provide the switching decision for driving the pulse generators 51 and 52 which fire the commutating and reset SCR's 27, 27a and 32, 32a.

The reference voltage $E_{ref}$ is multiplied by −1 by the inverter 57 and its output is summed with $E_a$ and $E_b$ to form the input $−E_{ref} +(E_a+E_b)$ to comparators 48, 49. The reference input is either from a stable a.c. reference 53, a dynamic reference 54 or a d.c. reference 56. The dynamic reference may, for example, be a motor control signal. Control pulses for the control SCR's are generated by the pulse generators 51 and 52.

The firing of the silicon controlled rectifiers 27 and 27a does not instantaneously change the output voltage $E_c$ from plus to minus, or minus to plus respectively. The changes occur when the regenerative diodes 28, 28a stop conducting. Thus, we find that the SCR's 23 and 24 must be delayed from the firing of the SCR's 32 and 32a an amount similar to the commutation time less the time necessary to maintain the required voltage overlap to maintain the average value of circulating current in inductors 26, 31 and 31a. The outputs of the comparators 48 and 49 are also coupled to ramp generators 58 and 59 which serve to generate ramp voltages. The ramp generators initiate a voltage ramp when the comparator output goes positive. These ramps are coupled to comparators 61 and 62 and are reset to zero by each other as shown.

Current shunts 37 and 37a are utilized by current sample means 26 and 27 respectively to determine the actual circulating current. The sum of the currents through shunts 37 and 37a is twice the circulating current which is compared to circulating current set voltage potentiometer 63 by the amplifier 66 whose output is summed algebraically with the positive reference voltage 67 and coupled to the comparators 61 and 62. It may be seen that if the circulating current is too small, the output of amplifier 66 will be negative and the negative comparator input voltages will become less positive resulting in an earlier switching time for each comparator. The comparator outputs are coupled to pulse generators 71 and 72 which fire the series pass SCR's 23 and 24. This will result in earlier firing times for the SCR's 23 and 24 and, therefore, more overlap and higher circulating current.

The operation of the programmed current switches PCS 1 and 2 and the circuit of FIGS. 2 and 3 was previously described with refernce to the waveforms of FIG. 4 and with the above it is clear how the circuit operates to provide output voltages controlled by the input reference signals. It is to be noted that in the example shown the output voltages are d.c. controlled output voltages but that if the reference signal is a different signal, sinewave or otherwise, the pulse width modulation will be such that the average output will give a signal corresponding to the reference signal, for example, if the reference signal is a 60 Hz signal, the output voltage will be a 60 Hz output voltage.

Figures 6, 7:
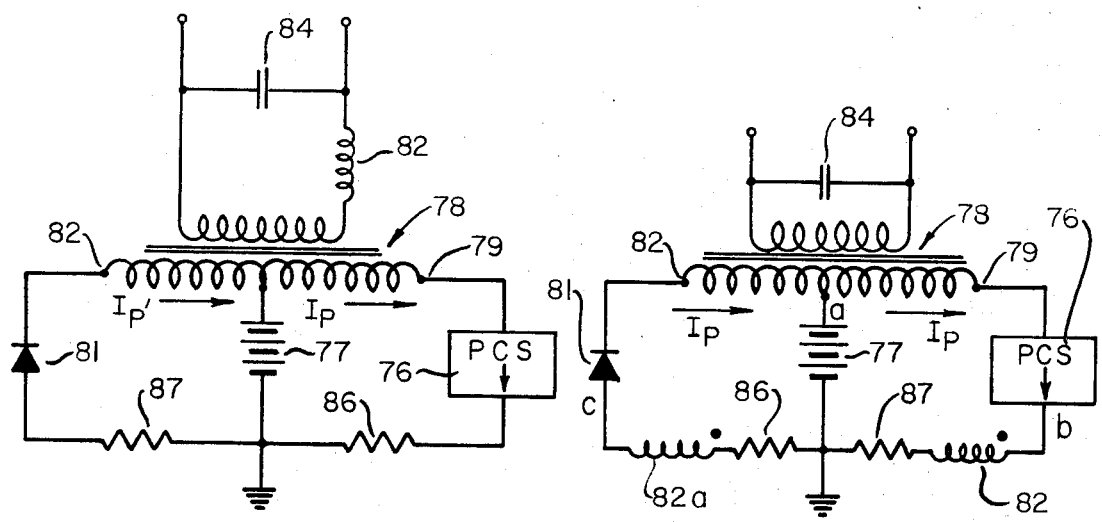
FIG. 6 is a simplified schematic circuit diagram of a center tapped load, single way, single phase, low frequency a.c. inverter with all filter elemnts in the output circuits.
FIG. 7 is a simplified circuit diagram of a center tapped load, single way, single phase, low frequency a.c. inverter with the filter inductor in the primary circuit.

FIG. 6 illustrates a converter circuit utilizing only one program current switch 76. A battery 77 is connected to the center tap of the primary of the output transformer 78 and the switch 76 is connected between end tap 79 and diode 81 which is connected to the other primary tap 82 through current shunts 86 and 87. When PCS 76 is turned on, the point 79 is at ground potential and the diode 81 is back biased with twice the battery voltage present at the terminal 82. Primary current $I_P$ flows through the open circuit inductance of the primary of the transformer as well as through PCS 76. When the PCS 76 is turned off, the non-zero magnetizing current is forced to flow through the diode 81 and point 82 is nominally at ground potential with the point 79 at twice battery voltage.

Figure 8:
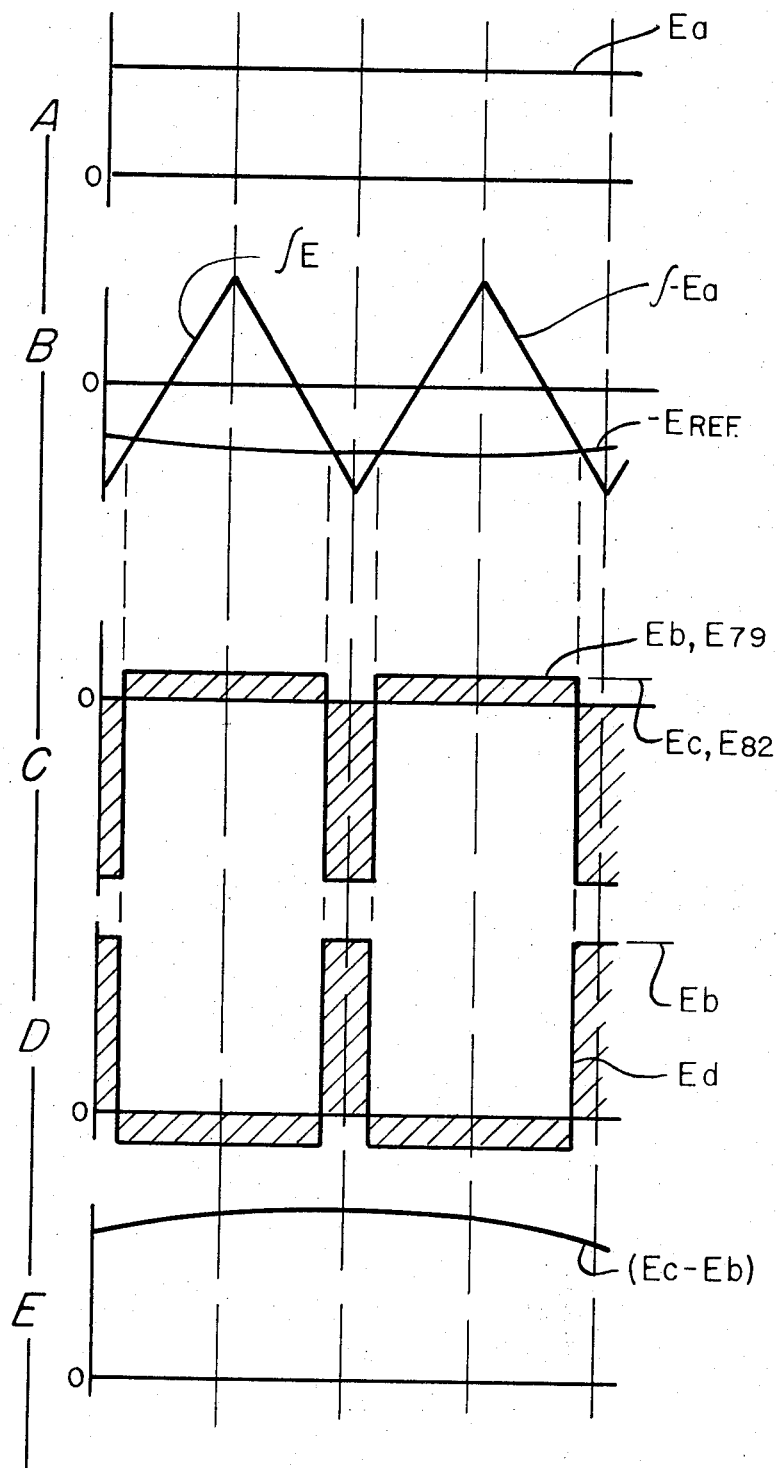
FIGS. 8A-E are waveforms useful in understanding the operation of the circuit of FIG. 7.

It may be seen that a regulated d.c. value of magnetizing current may be maintained by causing the PCS 76 to be switched on slightly longer than it is switched off during its normal relatively high frequency duty cycle, for example, 1,800 Hz. The duty cycle may have superimposed a lower frequency modulation which will provide the appropriate pulse width modulation for forming the desired output voltage signal. The transformer primary will have a modulated 1,800 Hz rectangular wave containing a significant lower frequency, for example, the control 60 cycle frequency reference signal. The 1,800 Hz can be effectively eliminated from the output by the output filter comprising the inductor 83 and capacitor 84. Output current as transformed by the transformer 78 is superimposed with the transformer primary d.c. magnetizing current and may be drawn from the system to a value slightly less than the d.c. magnetizing current. This algebraic summation of primary current flows alternately in each half of the transformer primary depending upon whether PCS 76 is on ($I_P$) or off ($I_{P'}$). $I_P$ and $I_{P'}$ are monitored by the voltage across the current shunts 86 and 87 respectively. Should the load demand excessive current in the direction maximizing $I_P$, PCS 76 is turned off early with the effect of reducing the programmed voltage and so controlling such excessive current. Should the load demand excessive current in the opposite direction, PCS 76 is turned on early. Finally, it may be seen that the high frequency portion of the output signal is eliminated by the inductor 83 and capacitor 84. Alternatively, the inductor 83 may be placed between the PCS 76 and ground with a magnetically inverted and tightly coupled secondary 82 between diode 81 and ground, as shown in FIG. 7. The waveforms shown in FIGS. 8A-8E illustrate the operation of the circuit of FIG. 7. FIG. 8A shows the voltage $E_a$ of battery 77. FIG. 8B shows the voltage integrated with periodic inversions to generate the sawtooth integrated voltage. FIG. 8B also shows schematically an a.c. reference signal $-E_{ref}$. The reference signal in this instance must be an alternating current signal since the circuit includes an output transformer. FIG. 8C represents the case where the instantaneous value of $E_{ref}$ is positive and PCS 76 is on for a longer period of time than it is off. In this instance the voltage at 79 is less than the voltage at the center tap and the voltage at 82 is greater than the voltage at the center tap and, therefore, the voltage impressed on the inductor 83 is rectangular in nature and unequal in voltage so that the voltage time integral is zero for each cycle of operation as shown in FIGS. 8C and 8D. FIG. 8E shows ($E_a - E_b$) for the circuit shown.

Figure 9:
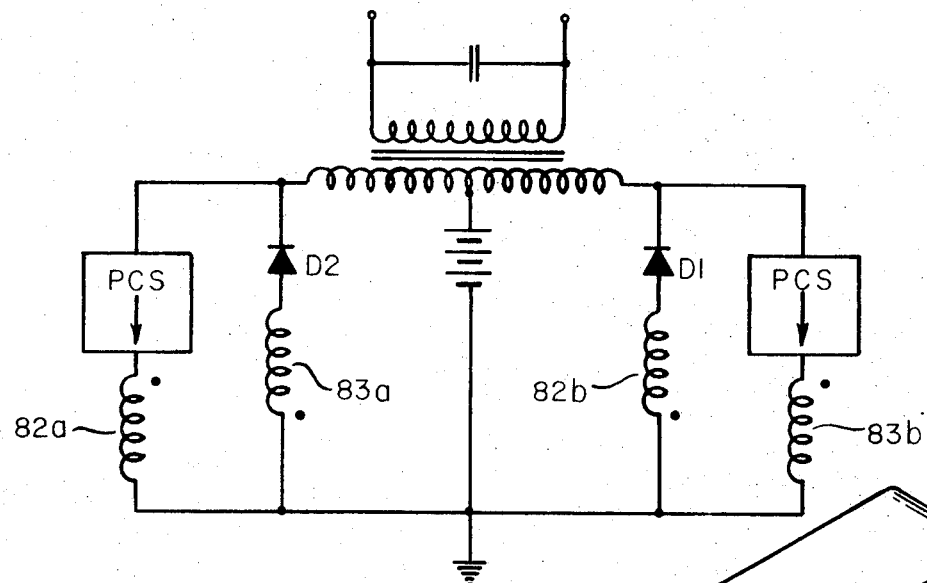
FIG. 9 is a simplified schematic circuit of a center tapped load, double way, single phase, low frequency a.c. inverter.

The single wave circuit of FIGS. 6 and 7 is primarily useful at very low power levels because of the great difficulties encountered in designing low frequency power transformers with d.c. magnetizing flux. This difficulty can be overcome with a tertiary winding conducting a bucking d.c. current. It may also be overcome by the use of a double-way circuit such as shown in FIG. 9. Two sets of PCS's, diodes and inductors are used as shown. The programming for each PCS is similar to that described with reference to FIGS. 6 and 7 but the lower frequency modulation for one is inverted 180° from that for the other. The d.c. magnetizing currents present in the transformer primary buck one another and so simplify the transformer design. Since both filter inductors 82, 82a and 83, 83a are on at all times, they are effectively in parallel and, therefore, must have twice the inductance and volt amp rating. Other single wave designs are possible.

Figure 10:
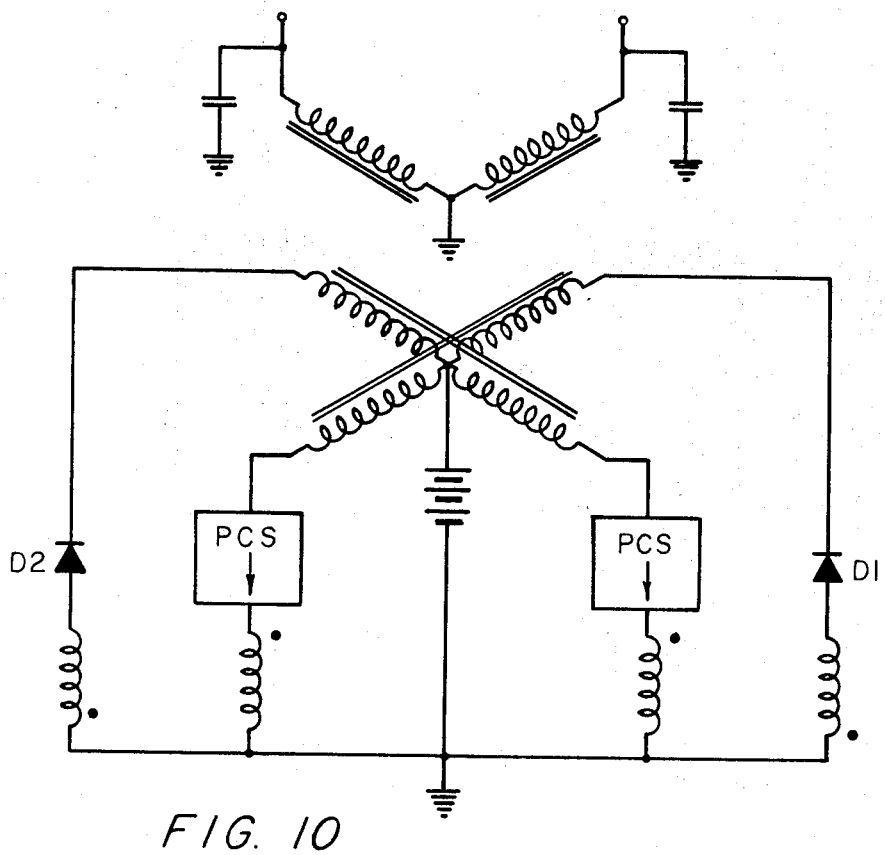
FIG. 10 is a simplified schematic circuit of a center tapped load, single way, two phase, low frequency a.c. inverter.
Figure 11A:
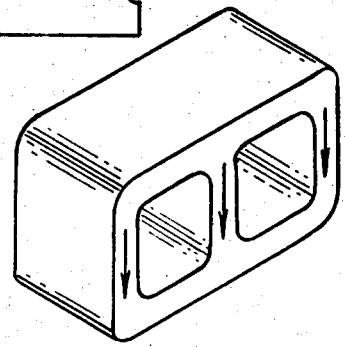
FIG. 11A is a schematic diagram of the transformer core used in the three phase inverter shown in FIG. 11.
Figure 11:
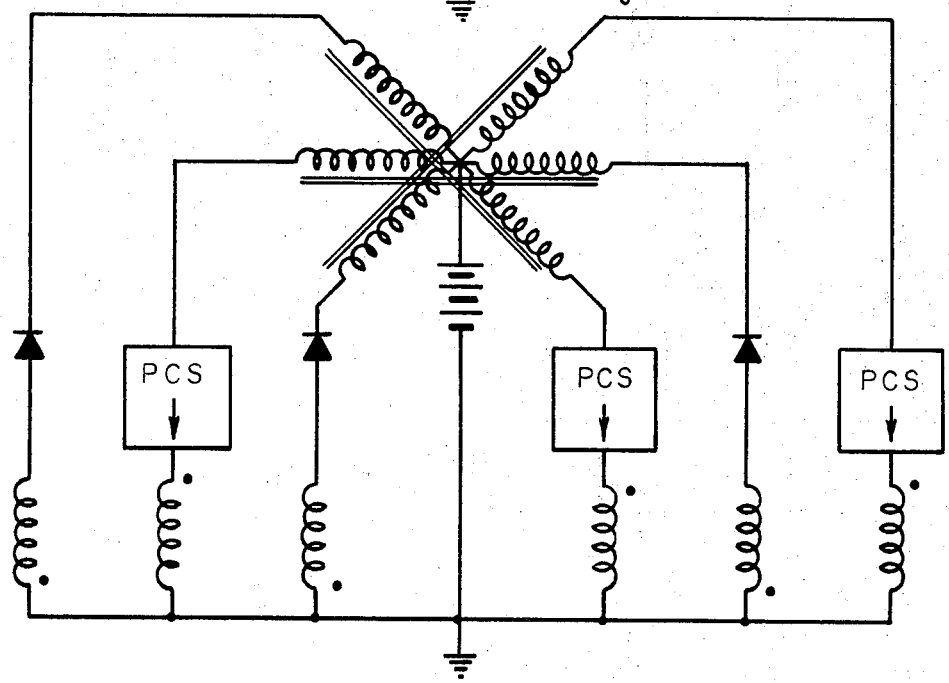
FIG. 11 is a simplified schematic circuit of a center tapped load, single way, three phase, low frequency a.c. inverter.

FIG. 10 illustrates two circuits similar to those shown in FIG. 2 programmed at 90° to one another to yield two phase output power. FIG. 11 illustrates three such circuits programmed at 120° to one another to yield three phase output power. If the output transformers are combined on a single three leg core, FIG. 11A, it may be seen that the d.c. fluxes for each leg cancel each other and, therefore, this particular circuit is suitable for moderate power levels.

Figure 12:
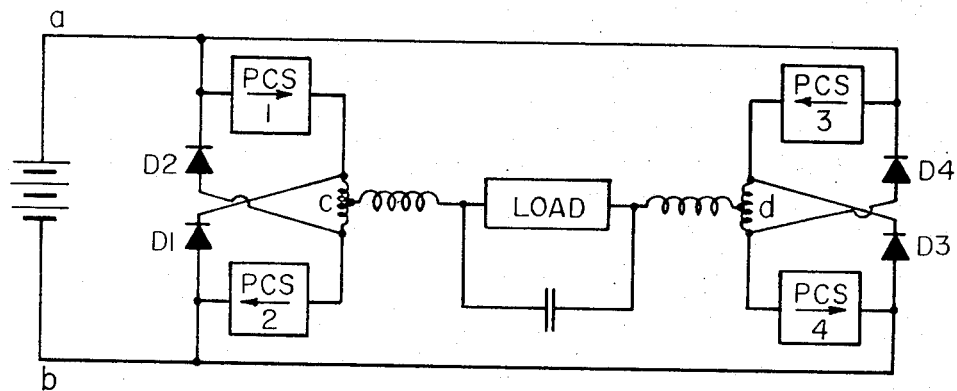
FIG. 12 is a simpified schematic circuit of a full wave bridge converter suitable for Mode II operation in accordance with the present invention.
Figure 14:
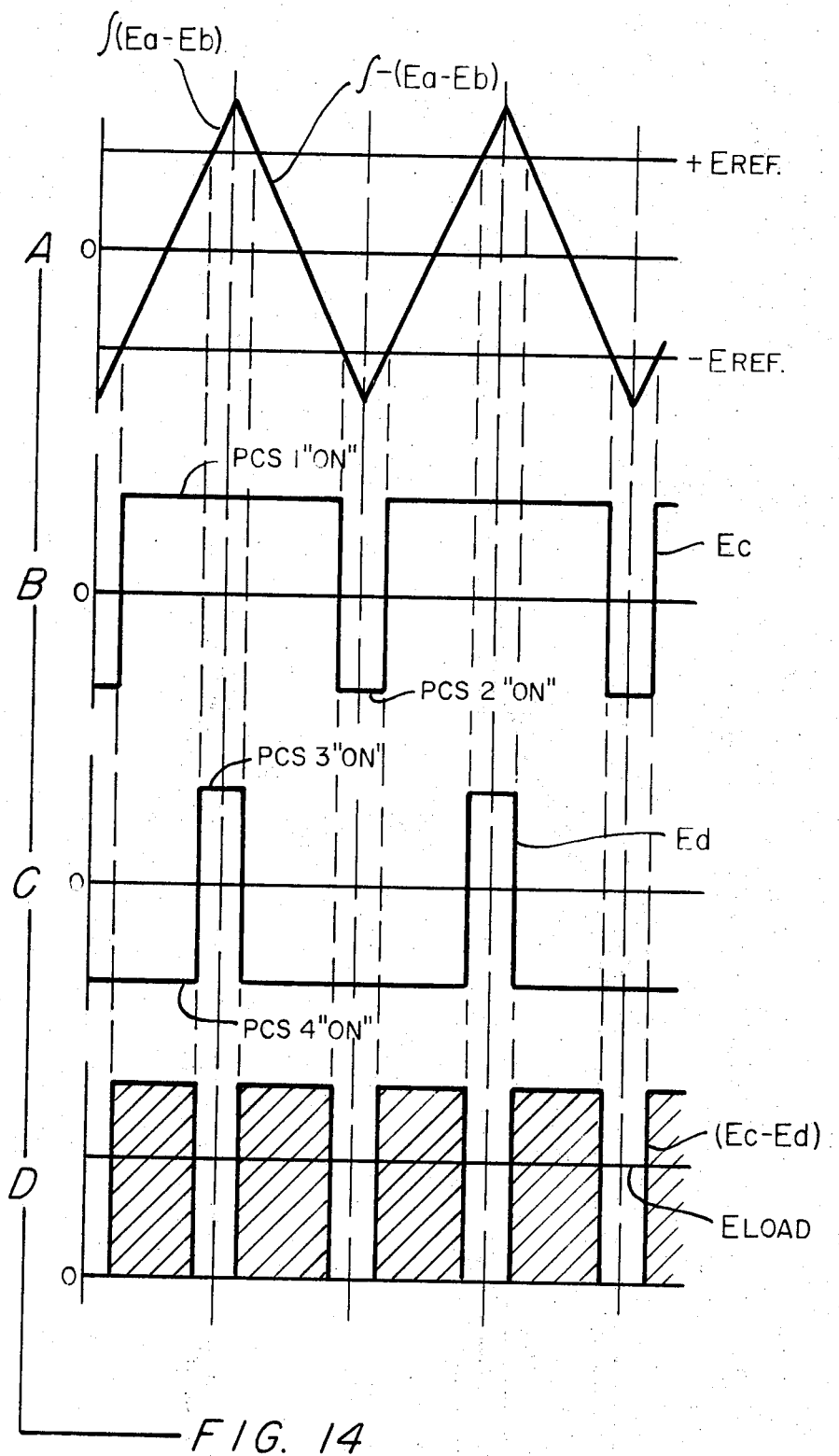
FIGS. 14A-D are waveforms useful in understanding the circuit of FIG. 13.

The circuits thus far described operate on a simple on-off switching sequence which gives one pulse per cycle of operation and herein termed Mode I operation. Two of the circuits, such as shown in FIGS. 2 and 3, may be combined in a full bridge as shown in FIG. 12. If these two circuits are operated at opposite output voltages with respect to one another by utilizing both $+E_{ref}$ and $-E_{ref}$ as shown in FIG. 14A in connection with the integrated and inverted d.c. battery voltage, the switching waveforms which appear at the points $c$ and $d$ in the circuit of FIG. 12 are shown in FIGS. 14B and 14C. Two pulses per cycle will result across the load as shown in FIG. 14D which is the algebraic sum of the voltage at the point $c$ less the voltage at the point $d$. This higher performance type of operation is hereinafter referred to as Mode II.

Figure 13:
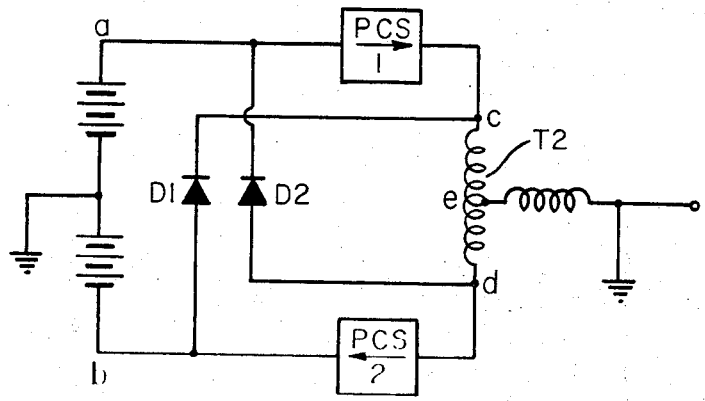
FIG. 13 is a simplified schematic circuit of a center tapped power supply converter for Mode II operation.

Mode II operation may also be obtained from the basic circuit of FIGS. 2 and 3 by introducing an autotransformer T2 such as shown in FIG. 13. The open circuit inductance is sufficient to allow coincident "on" states for PCS 1 and PCS 2 and maintain circulating current through the diodes D1 and D2 during coincident "off" states for PCS 1 and PCS 2.

Figure 15:
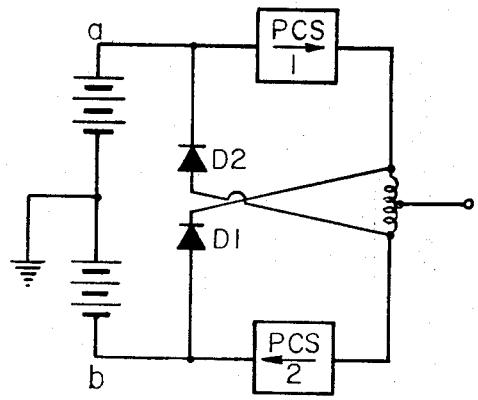
FIG. 15 is a simplified schematic circuit of a center tapped power supply, high frequency squarewave inverter.
Figure 16:
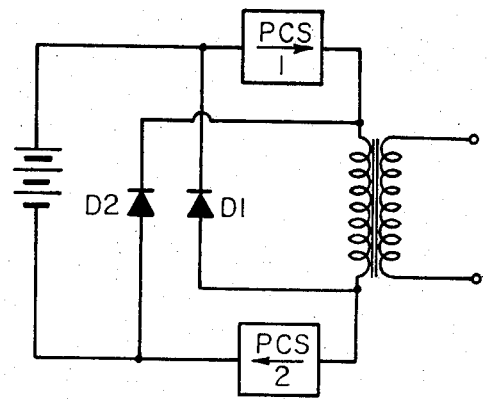
FIG. 16 is a simplified schematic circuit of a high frequency squarewave inverter suitable for modified Mode II operation.

High frequency squarewave inverter operation may be obtained from these circuits by programming balanced operation and eliminating the low pass output filter. Operation may be in either mode style as shown in FIGS. 15 and 16 but the circuit of FIG. 16 may only be operated so as to provide a squarewave of the same frequency as that of FIG. 15 and, therefore, not true Mode II operation. It may, however, be programmed so as to regulate the RMS or average output.

Figure 17:
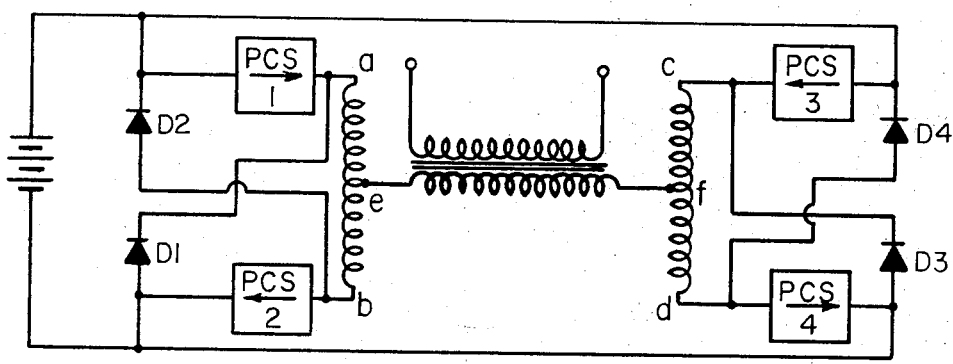
FIG. 17 is a simplified schematic circuit of a high frequency squarewave inverter for Mode II operation.
Figure 18:
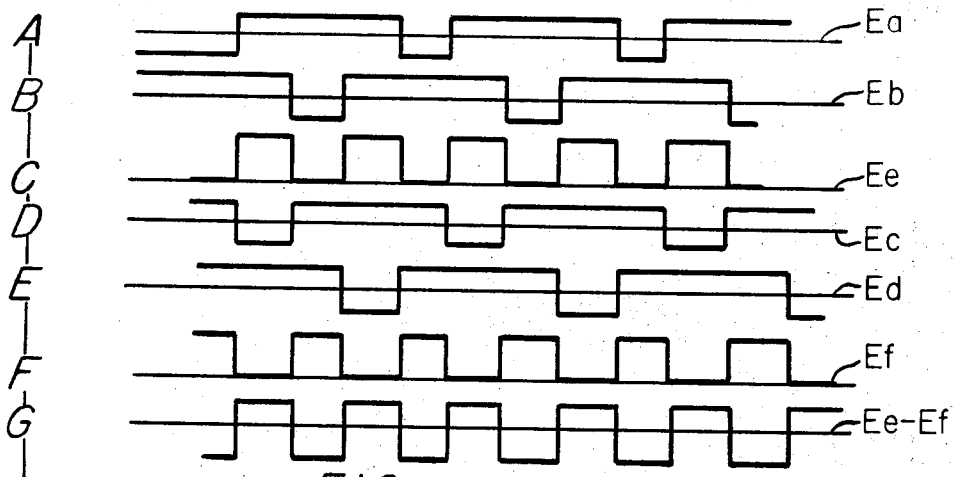
FIGS. 18A-G are a.c. waveforms useful in understanding operation of the circuit of FIG. 17.

FIG. 17 illustrates a full bridge configuration of FIG. 13 and is suitable for true Mode II squarewave inverter operation as shown in FIGS. 18A-G. If both sides are programmed for a 50 percent positive (or negative) voltage waveform, but translated at 90° phase angle one to the other with reference to their nominal base operating frequency, then a squarewave of twice their base operating frequency will appear across the load.

Figure 19:
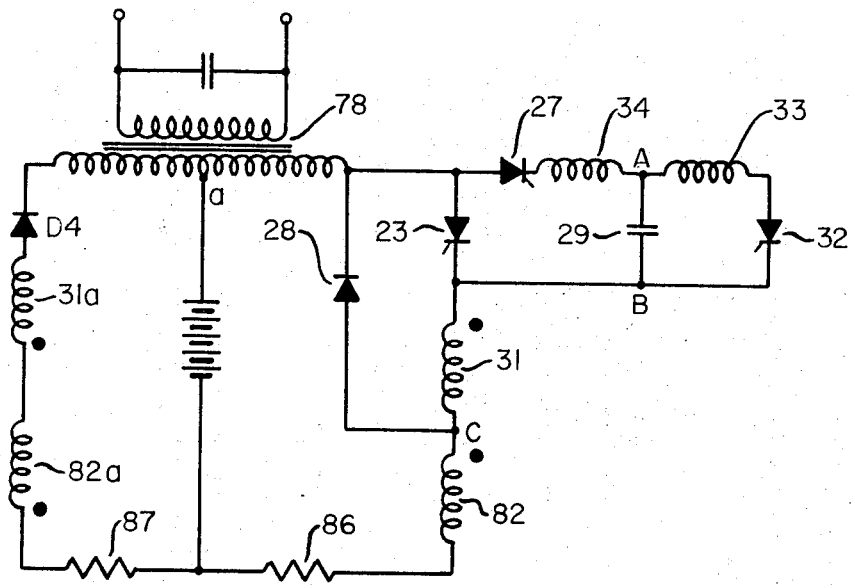
FIG. 19 is a detailed circuit diagram of the simplified schematic circuit of FIG. 2.

FIG. 19 is a more complete circuit diagram of FIG. 7. The reference numbers applied correspond to those of FIGS. 2, 3 and 7 for like parts. Inductor 31 has an inverted, tightly coupled secondary 31a similar in character to 82a. Operation is started by connecting a high impedance resistor from point A to the battery plus and then proceeds as shown in Table I.

Thus, it is seen that there have been provided novel inverters and power converter circuits capable of delivering a.c. and d.c. output currents or rectangular waveforms dependent upon the programming of the inverters and a new programmed current switch for use therewith.

I claim:

1. A converter for converting a d.c. input voltage to an a.c. or d.c. output voltage comprising input terminals adapted to be connected to receive said input voltage and output terminals adapted to connect said output voltage to a load, at least one programmed current switch connected between said input and output terminals, said switch being responsive to control signals to switch the current applied to said load whereby to provide a pulse width modulated voltage to said load, said programmed current switch including a series pass silicon controlled rectifier, an inductor in series with said series pass silicon controlled rectifier, means responsive to a turn-off signal connected across said silicon controlled rectifier for applying a high back bias voltage to said series pass silicon controlled rectifier to extinguish the rectifier and provide current in excess of said load current, uni-directional current control means connected to conduct current in excess of load current from the output terminals to the input terminals of said converter and means for conducting load current after turn-off of said series pass silicon controlled rectifier.

2. A converter as in claim 1 wherein said means for back biasing said silicon controlled rectifier comprises a series branch including a commutating silicon controlled rectifier, an inductor and a capacitor.

3. A converter as in claim 2 including means for resetting said commutating silicon controlled rectifier.

4. A converter as in claim 3 wherein said resetting means includes a silicon controlled rectifier.

5. A converter comprising an output transformer having a primary winding with first and second terminals and a center tap terminal, said center tap terminal adapted to be connected to one terminal of an associated d.c. power source having one and another terminal, a programmed current switch having a terminal connected to one terminal of the primary winding and another terminal adapted to be connected to the another terminal of said d.c. power source and a rectifier having one terminal connected to the other terminal of said primary winding and another terminal adapted to be connected to said d.c. power source, said program current switch including a series pass silicon controlled rectifier connected to said d.c. power source and adapted to be turned on to conduct current between said transformer primary center tap and said first terminal, an inductor in series with said silicon controlled rectifier connected to the one terminal, means responsive to a turn-off signal connected across said silicon controlled rectifier for applying a high back bias voltage to said silicon controlled rectifier to extinguish the silicon controlled rectifier and provide current in excess of the load current and stop the conduction of current through said silicon controlled rectifier, and a diode connected across said silicon controlled rectifier and inductor to conduct said excess current, said rectifier serving to alternately conduct current between said transformer primary center tap and the second terminal.

6. A converter comprising a plurality of circuits each including an output transformer having a primary winding with first and second terminals and a center tap terminal and a secondary winding, said center tap terminal adapted to be connected to one terminal of an associated d.c. power source, a programmed current switch having a terminal connected to one terminal of the primary winding and another terminal adapted to be connected to the other terminal of said d.c. power source and a rectifier having one terminal connected to the other terminal of said primary winding and another terminal adapted to be connected to the other terminal of said d.c. power source, said program current switch including a series pass silicon controlled rectifier adapted to be turned on to conduct current between said transformer primary center tap and said one terminal, an inductor in series with said silicon controlled rectifier, means responsive to a turn-off signal connected across said silicon controlled rectifier for applying a high back bias voltage to said silicon controlled rectifier to extinguish the silicon controlled rectifier and stop the conduction of current through said silicon controlled rectifier, said rectifier serving to alternately conduct current between said transformer primary center tap and the other terminal, said center tap terminals of said transformers being connected to one another and said another terminal of said programmed current switch and of said rectifier being connected to one another and to said other terminal of said d.c. power source, said secondary windings being interconnected to supply output power.

7. A converter as in claim 5 including uni-directional current control means connected to conduct excess load currents from said one transformer primary terminal to the another terminal of said d.c. power source.

8. A converter comprising an output transformer having a primary winding having a center tap and first and second terminals, said center tap terminal being adapted to be connected to one terminal of a d.c. power source, first and second programmed current switch means having one terminal connected to said first transformer terminal and a second terminal adapted to be connected to said d.c. source, second programmed current switch means having one terminal connected to the second transformer terminal and a second terminal adapted to be connected to said d.c. source, first and second diode means connected in parallel with said second and first programmed switch means respectively to alternately provide current paths for said first and second programmed switches, said programmed switches comprising a series pass silicon controlled rectifier, an inductor in series with said series pass silicon controlled rectifier, means responsive to a turn-off signal connected across said silicon controlled rectifier for applying a high back bias voltage to said series pass controlled rectifier to extinguish it and provide current in excess of the load current and uni-directional current control means connected to conduct excess load currents from said output terminals to the input terminals of said converter.

9. A converter comprising first and second input terminals, a programmed current switch connected between said first input terminal and an output load terminal, and a second programmed current switch connected between the second input terminal and said output load terminal, said first and second programmed current switches each including a series pass silicon controlled rectifier, an inductor in series with said series pass silicon controlled rectifier, means responsive to a turn-off signal connected across said silicon controlled rectifier for applying a high back bias voltage to said series pass silicon controlled rectifier to extinguish it and provide current in excess of said load current, first and second unidirectional current control means connected across said first and second switches to conduct current in excess of load currents from the output of each switch to the input terminals, and first and second means for conducting load currents after turn-off of said series pass silicon controlled rectifiers connected between the input terminal of said first and second programmed current switches and the output terminal of said second and first programmed current switches respectively.

10. A converter as in claim 9 wherein said means for back biasing said silicon controlled rectifier comprises a series branch including a commutating silicon controlled rectifier, an inductor and a capacitor.

11. A converter as in claim 10 including means for resetting said commutating silicon controlled rectifier.

12. A converter as in claim 11 wherein said resetting means includes a silicon controlled rectifier.

13. A converter as in claim 12 including means for controlling the $di/dt$ turn-on and means for controlling $dv/dt$ upon reapplication of forward voltage to said silicon controlled rectifiers.

14. A converter as in claim 9 including a transformer connected between the load and the output terminals of said programmed current switches.

15. A converter as in claim 14 wherein said transformer comprises an autotransformer.

16. Apparatus comprising at least first and second converters each comprising first and second input terminals, a programmed current switch having first and second terminals connected between said first input terminal and an output load terminal respectively, and a second programmed current switch having first and second terminals connected between the second input terminal and said output load terminal, said first and second programmed current switches including a series pass silicon controlled rectifier, an inductor in series with said series pass silicon controlled rectifier, means responsive to a turn-off signal connected across said series pass silicon controlled rectifier for applying a high back bias voltage to said series pass silicon controlled rectifier to extinguish it and provide current in excess of load current, first and second uni-directional current control means connected across said first and second programmed current switches to conduct current in excess of load currents from the output of the switches to the input, and first and second means for conducting load currents after turn-off of said series pass silicon controlled rectifiers connected between the first terminal of said first and second programmed current switches and the second terminal of said second and first programmed current switches respectively, and a load connected between the output load terminal of said first and second converters.

17. A converter as in claim 16 including a transformer connected between the load and the second terminal of the programmed current switches of each of said converters.

18. A converter as in claim 17 wherein said transformer comprises an autotransformer.

19. Apparatus as in claim 12 including means for receiving said d.c. input voltage and integrating the voltage, comparison means for comparing said voltage with a reference voltage corresponding to the desired output and provide a control signal and means responsive to the control signal for generating firing voltages for said silicon controlled rectifiers to provide a desired output voltage.

20. Apparatus as in claim 4 including means for receiving said d.c. input voltage and integrating the voltage, comparison means for comparing said voltage with a reference voltage corresponding to the desired output and provide a control signal and means responsive to the control signal for generating firing voltages for said silicon controlled rectifiers to provide a desired output voltage.

* * * * *